United States Patent [19]

Prager et al.

[11] Patent Number: 4,823,064
[45] Date of Patent: Apr. 18, 1989

[54] QUICK RESET MOTOR STARTING DEVICE

[75] Inventors: Lee A. Prager, Raymond; Douglas C. Carbone, Standish, both of Me.

[73] Assignee: GTE Products Corporation, Stamford, Conn.

[21] Appl. No.: 161,511

[22] Filed: Feb. 29, 1988

Related U.S. Application Data

[62] Division of Ser. No. 46,758, May 7, 1987.

[51] Int. Cl.[4] .............................................. H02P 1/44
[52] U.S. Cl. ...................................... 318/783; 318/473
[58] Field of Search ................. 318/471, 472, 473, 783

[56] References Cited

U.S. PATENT DOCUMENTS

| | | | |
|---|---|---|---|
| 3,824,328 | 7/1974 | Ting et al. | 338/22 R |
| 3,955,170 | 5/1976 | Geishecker | 318/471 |
| 3,973,100 | 8/1976 | Flanagan | 219/505 X |
| 4,104,509 | 8/1978 | Van Bokestal et al. | 338/22 R |
| 4,241,370 | 12/1980 | De Filippis et al. | 318/783 X |
| 4,272,714 | 6/1981 | Vind | 318/783 |
| 4,408,244 | 10/1983 | Weible | 318/471 |
| 4,500,825 | 2/1985 | Schemmann | 318/783 |

Primary Examiner—Benjamin Dobeck
Attorney, Agent, or Firm—James Theodosopoulos

[57] ABSTRACT

A PTC motor starting device is disclosed including a PTC resistor body having a pair of electrodes disposed on the PTC body and a lead terminal extending outwardly from each of the electrodes. A heat sink material is disposed about the PTC resistor body to absorb the heat generated by the PTC resistor body to reduce the temperature of the PTC resistor body to a temperature below the anomalous or reset temperature. A casing is disposed about the heat sink material.

6 Claims, 2 Drawing Sheets

QUICK RESET MOTOR STARTING DEVICE

This is a divisional of co-pending application Ser. No. 046,758 filed on May 7, 1987.

This invention relates to positive temperature coefficient thermistor (PTC) devices for use in motor starting apparatus and more particularly to an improved PTC device for use in motor starting apparatus where reset time is critical.

BACKGROUND OF THE INVENTION

PTCs have been in use as motor starting switches for many years, where reset time is not a critical factor, for example in refrigeration and air conditioning apparatus. Additionally, motors utilizing a centrifugal start are generally motors which are employed for intermittent, short run applications. Typically, centrifugal switches will energize the start winding until sufficient motor speed is reached causing the centrifugal mechanism to disengage the switch and thereby deenergize the start winding. Although these switches all almost no resistance in series with the start winding, contact arcing (which occurs due to mechanical make and break) can reduce the life of this system. Also, the number and complexity of components means a higher cost associated with such centrifugal starting systems.

While such prior art devices have provided improvement in the area intended, there still exists a great need for a quick or rapid reset motor starting device.

Accordingly, a principal object of the present invention is to provide a quick reset motor starting device.

Another object of the present invention is to provide a PTC reset motor starting device which provides for substantially instantaneous reset design.

A still further object of the present invention is to provide a PTC quick reset motor starting device having an improved heat dissipation feature.

Other objects and advantages of the present invention will in part appear hereinafter and will in part become apparent after consideration of the specification with reference to the accompanying drawings.

SUMMARY OF THE INVENTION

Before describing the present invention, a brief description of the PTC resistors and their operation is believed to be helpful. PTC resistors are formed of ceramic materials, for example, a lanthanum-doped barium lead titinate. When an electric current is directed through such ceramic materials, the materials tend to heat and to display increasing resistivity so that current in the resistor is reduced and so that the rate of heat generation by the resistor is decreased. When the rate of heat generation reaches equilibrium with the rate of heat dissipation from the resistor, the resistor temperature stabilizes and limits the resistor current to a selected level. The initial room temperature resistivity of a PTC resistor material and the rate of change of resistivity with temperature are characteristic of the material, and the materials used in such resistors are commonly chosen to display a sharp anomalous increase in resistivity at a particular temperature, the anomalous temperature, to thereby limit the heating of the resistor at about that temperature while also reducing resistor current to a very low level at such stabilizing temperature. In the application of PTC resistor devices to motor starting apparatus where reset time is critical, it is important that the temperature of the resistor device be reduced below the anomalous temperature to thereby reduce the resistivity of the resistor preferably to the initial room temperature resistivity whereby the maximum current may flow for the motor start and restart application. In the PTC device art, the term anomalous temperature or internal switch temperature shall mean that temperature of the PTC resistor above which the resistor changes to its minimum resistance characteristics.

In accordance with the present invention, we have discovered that rapid reduction of the thermal energy generated by the PTC during the start cycle of the motor to a level below the anomalous temperature of the PTC resistor may be accomplished by encapsulating or potting the PTC resistor in a thermally conductive composition which provides sufficient dissipation and absorption of the thermal energy of the start up cycle to allow a substantially reduced reset time. As broadly stated, the present invention provides for encapsulating the PTC resistor in a material which acts a heat sink to dissipate generated heat and thereby allow for reduced reset times, that is, a return to low resistance high current flow features. In accordance with one embodiment of the invention, the heat sink is formed by encapsulating the PTC resistor within a matrix material containing metal oxide particles and which is enclosed with a casing to form the completed starting device. In another embodiment of the invention, the heat sink is formed by encapsulating the PTC resistor in a material which exhibits a temperature phase change when heated thereby absorbing the surrounding heat generated by the PTC resistor to effect the phase change and thereby reduce the PTC resistor temperature to below its anomalous temperature. The encapsulated PTC is disposed within a suitable enclosure to form the completed starting device. In a preferred embodiment, the PTC resistor is provided with a welded lead contact to eliminate the conventional use of silver and also provide for a longer life of the device.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF THE PREFERRED EMBODIMENTS

Figure 1:
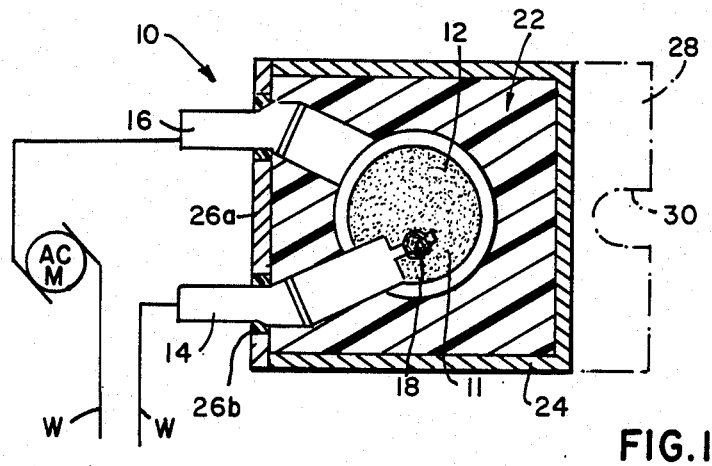
FIG. 1 is a top cross-section view of one embodiment of the PTC starting device of the present invention using a metal oxide filled silicone matrix composition as the heat sink.
Figure 2:
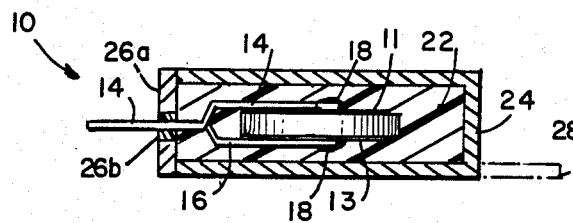
FIG. 2 is a side cross-sectional view of another embodiment of the PTC starting device shown in FIG. 1.

Referring now to FIGS. 1 and 2 of the drawing, there is illustrated generally at 10 a PTC motor starting device in accordance with the present invention. A motor M is connected to a power supply through wires W. As illustrated, the PTC device 10 includes a positive temperature coefficient thermistor (PTC) resistor 12 having a pair of electrodes 11 and 13 and a pair of spade terminals 14 and 16 attached respectively to electrodes 11 and 13 by ultrasonic lead weld 18. The PTC resistor 12 and portions of terminals 14 and 16 are encapsulated in a composition disposed within a suitable metal casing 24. Suitable metal casings may be formed of such metals as steel, aluminum, magnesium, and alloys and mixtures thereof. A suitable matrix material is one which can be mixed with the metal oxide particles to form a pliable, moldable mixture which, upon exposure to air, solidifies to a relatively hard composition such as magnesium oxide in silicone rubber, generally with the $M_gO$ in a preponderance and preferably in a weight ratio of 80 to 20 $M_gO$ to silicone rubber. The matrix composition 22 so formed is then extruded or otherwise inserted into the metal casing and the PTC resistor 12 and a portion of terminals 14 and 16 are inserted into the matrix composition 22 and the cover 26a is attached. Cover 26a is insulated from terminals 14 and 16 by insulator 26b. As mentioned, one suitable matrix material is the silicone sealant compound sold commercially as is well known. The metal oxide particles serve to conduct and transfer and disperse the heat generated by the PTC resistor to the matrix composition thereby reducing the temperature of the PTC resistor to below the anomalous temperature. In one preferred embodiment, the casing may be provided with an extension 28 (shown by the dotted lines) having a slot 30 to receive a suitable hold down or attaching bolt not shown.

Figure 3:
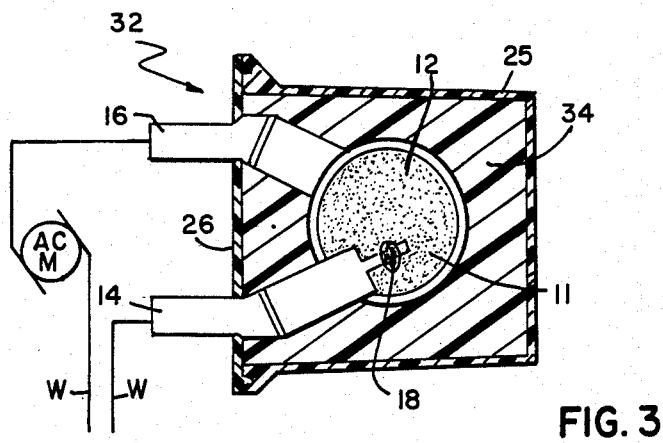
FIG. 3 is a top cross-section view of another embodiment of the PTC device of the present invention using a temperature phase change material as the heat sink.
Figure 4:
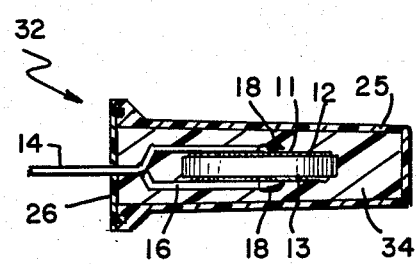
FIG. 4 is a side cross-section view of the PTC starting device shown in FIG. 3.

Referring now to FIGS. 3 and 4 of the drawing, there is illustrated generally at 32 another embodiment of the PTC starter of the present invention. A motor M is connected to a power supply through wires W. In this embodiment, the PTC device is the same as the PTC device of FIGS. 1 and 2 except that the casing 25 is formed of a suitable high temperature resistant plastic material such as polyetherimide and the heat sink material 34 comprises a material which exhibits a phase change when subjected to heat whereby the heat of fusion during the phase change absorbs heat generated from the PTC resistor and thereby reduces the PTC resistor temperature to below the anomalous temperature. Some suitable materials having phase change characterisitcs are, for example, red paraffin wax, white paraffin wax, polyethylene, and the like. As mentioned previously, a high level of current flows through the PTC resistor device into the motor's start winding while the PTC is cool and in the low resistance operating region. $I^2R$ heating then causes the PTC resistor to self heat, and at the predetermined anomalous temperature to switch to a high resistance state thereby limiting the start winding current to a very low level. For example, a typical PTC resistor will have a resistance of between 1-2 ohms below the anomalous temperature and resistance which increases rapidly to 10,000 ohms or more at a temperature of about 210° C. and in excess of about 50,000 ohms at a temperature of about 280° C. Accordingly, it can be appreciated that the phase change temperature range of the heat sink material may be selected to thereby maximize heat absorption and therefore cooling of the PTC resistor to below the anomalous temperature and low resistance high current region. With both heat sinks, eg. $M_gO$/silicone and paraffin wax, reset times of 5 seconds are realized.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in a limiting sense.

As our invention, we claim.

1. A combination for restarting electric motors, said combination comprising:
  an electric motor, means to connect said motor to a power supply and a starter device, said starter device comprising:
  a PTC resistor formed of a body and a pair of electrodes disposed on said body, said PTC resistor having a predetermined anomalous point;
  a lead terminal extending outwardly from each of said electrodes, said PTC resistor being capable of generating heat upon application of current to said electrodes, whereby the temperature of said PTC resistor can be increased;
  a heat sink material disposed about said PTC resistor, said heat sink material comprising a metal oxide thermal conductor in particulate form dispersed in an electrically non-conductive matrix material, whereby the heat generated by said PTC resistor is reduced to a temperature below the anomalous point;
  a cover surrounding and enclosing said heat sink material; and
  means electrically connecting said motor and the lead terminals of said PTC resistor to a power supply, whereby to restart the motor.

2. A combination for restarting electric motors, said combination comprising:
  an electric motor, means to connect said motor to a power supply and a starter device, said starter device comprising:
  a PTC resistor formed of a body and a pair of electrodes disposed on said body, said PTC resistor having a predetermined anomalous point;
  a lead terminal extending outwardly from each of said electrodes, said PTC resistor being capable of generating heat upon application of current to said electrodes, whereby the temperature of said PTC resistor can be increased;
  a heat sink material disposed about said PTC resistor, said heat sink material comprising a material capable of exhibiting a phase change when subjected to heat from a PTC resistor, said being selected from the group consisting of wax, paraffin and polyethylene, whereby the heat of fusion of said change absorbs heat generated by said PTC resistor and the heat generated by said PTC resistor is reduced to a temperature below its anomalous point;
  a covering surrounding and enclosing said heat sink material; and
  means electrically connecting said motor and said lead terminals of said PTC resistor to a power supply, whereby to restart the motor.

3. The combination according to claim 2 wherein said heat sink material includes a silicone sealant compound.

4. The combination according to claim 2 wherein said lead terminals are welded to said electrodes.

5. The combination according to claim 2 wherein the casing is formed of a high temperature resistant plastic material.

6. The combination according to claim 2 wherein the casing is formed of metal.

* * * * *